March 4, 1924. 1,485,741
W. A. TURBAYNE
DYNAMO ELECTRIC MACHINE
Original Filed Dec. 19, 1918    2 Sheets-Sheet 1
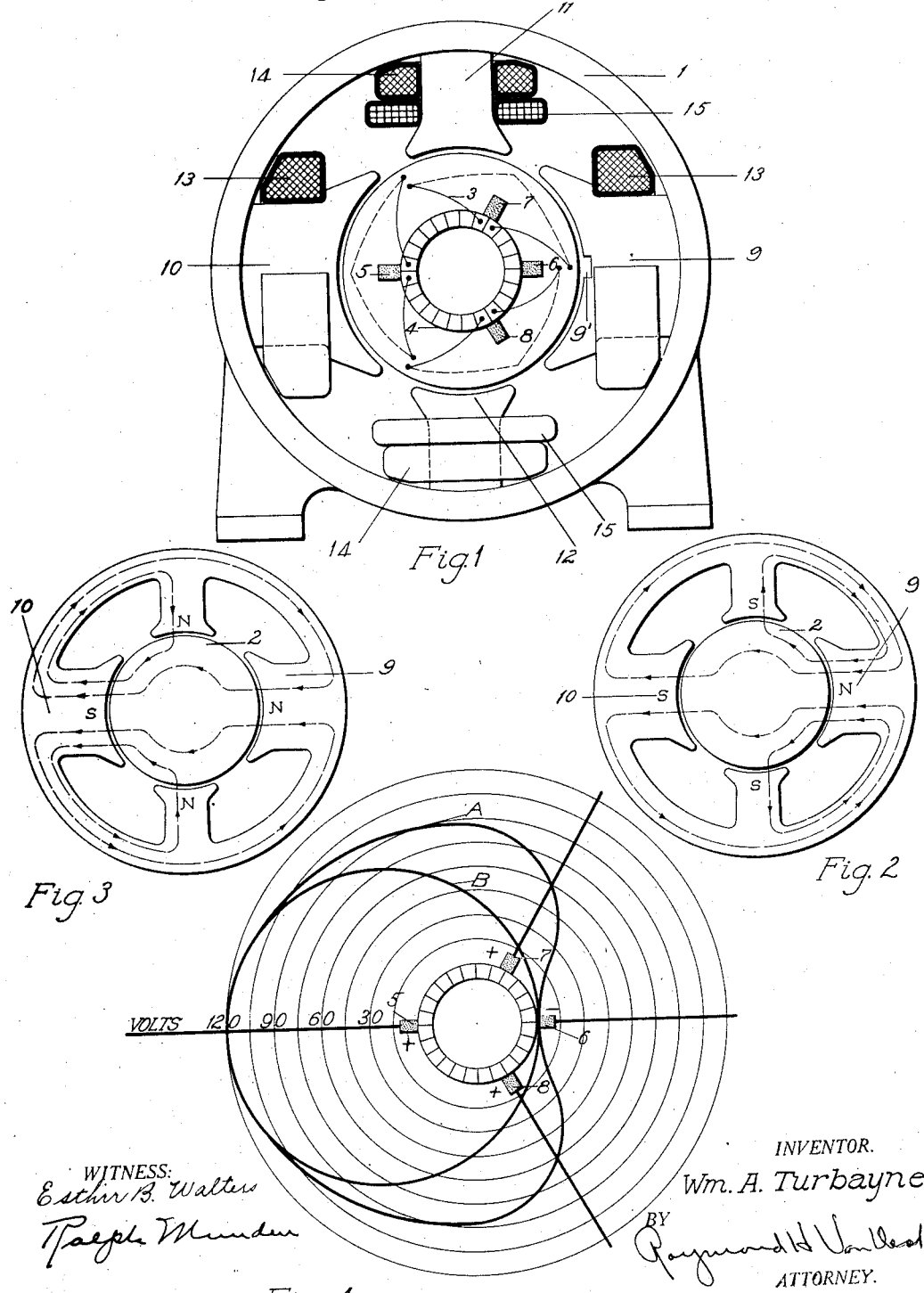
WITNESS:
Esther B. Walters
Ralph Munden
INVENTOR.
Wm. A. Turbayne
BY Raymond H. Van Hest
ATTORNEY.

March 4, 1924.

W. A. TURBAYNE

DYNAMO ELECTRIC MACHINE

Original Filed Dec. 19, 1918      2 Sheets-Sheet 2

1,485,741

WITNESS:
Esther B. Walters

INVENTOR.
Wm. A. Turbayne
BY
ATTORNEY.

Patented Mar. 4, 1924.

1,485,741

UNITED STATES PATENT OFFICE.

WILLIAM A. TURBAYNE, OF NIAGARA FALLS, NEW YORK, ASSIGNOR TO U. S. LIGHT & HEAT CORPORATION, OF NIAGARA FALLS, NEW YORK, A CORPORATION OF NEW YORK.

DYNAMO-ELECTRIC MACHINE.

Application filed December 19, 1918, Serial No. 267,468. Renewed July 6, 1923.

*To all whom it may concern:*

Be it known that I, WILLIAM A. TURBAYNE, a citizen of the United States, residing at Niagara Falls, in the county of Niagara and State of New York, have invented new and useful Improvements in Dynamo-Electric Machines, of which the following is a specification.

The present invention relates to dynamo electric machines.

More particularly the present invention relates to that class of dynamo electric machine in which there are combined in a single machine the functions and advantages of a motor generator set. The present invention relates to the same general subject-matter as that disclosed in application, Serial No. 96,091, filed May 8, 1916, for dynamo electric machines, by the present applicant, and in certain respects, constitutes an improvement over the dynamo-electric machine disclosed in said application.

An object of the present invention is to provide a direct current converter in a single machine in which the same flexibility and range of regulation of output may be obtained as from a motor generator set.

Another object of the present invention is to provide a single dynamo electric machine of the class above mentioned in which the major portion of the armature windings carry only the difference between the output and input currents so that the conversion of electrical energy may be brought about within the machine under a high efficiency of operation.

A further object of the present invention is to provide a dynamo electric machine of the above mentioned class requiring a minimum cross-section of copper.

The present invention has been illustrated herein in simple form for the purpose of simplifying the description. A bipolar field structure is disclosed. It will be evident, however, that the number of poles may be multiplied as desired, so long as the electrical and magnetic relations are maintained. According to the machine illustrated, a field structure sets up a main magnetic flux threading the armature. Means are also provided for setting up a flux varying in degree and direction under different conditions of operation to modify the main flux, whereby to control the voltage developed on the output side of the machine.

Referring to the drawings—

Fig. 1 represents a dynamo-electric machine according to the present invention.

Figs. 2 and 3 are diagrammatic views illustrating the flux distribution in the field frame under different conditions of operation.

Fig. 4 is a polar diagram illustrating the voltages on the commutator under different conditions of load.

Figure 5:
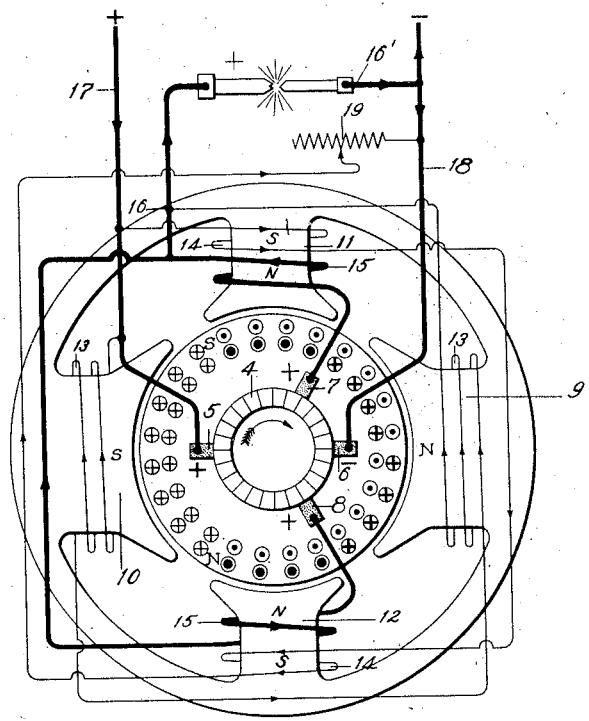
Figs. 5 and 6 show the connections of the dynamo-electric machine with the outside circuits.

Fig. 1 represents in simplified form, a dynamo electric machine according to the present invention. The armature 2 is provided with conductors 3 arranged to form coils. The ends of each coil are connected by symmetrically arranged end connectors to adjacent commutator bars of the commutator 4. Fig. 1 illustrates only three coils but it will be understood, of course, that additional coils are distributed around the armature. Bearing on the commutator 4 is a pair of brushes 5 and 6, which will be referred to herein as primary brushes. Said brushes 5 and 6 are arranged 180° apart and are connected to an outside circuit which will be referred to herein as the supply circuit. Arranged substantially 60° on either side of brush 6 are brushes 7 and 8, which may be connected to another circuit, which will be referred to herein as the output circuit. Said brushes 7 and 8 will be referred to herein as secondary brushes.

The field frame 1 has a pair of main pole pieces 9, 10, which are diametrically arranged on opposite sides of the armature 2. With an armature having symmetrical end connections, as illustrated herein, brushes 5 and 6 will be in line with field poles 9 and 10. Spaced between said pole pieces 9 and 10 are the modifying pole pieces 11 and 12. Main pole pieces 9 and 10 are provided with field windings 13, 13, while each of modifying pole pieces 11 and 12 is provided with a pair of windings 14 and 15.

The coils of the armature have a pitch of 120 electrical degrees relative to the main pole pieces 9 and 10. In the bipolar structure illustrated, the winding pitch will be actually 120 degrees. In case the number of poles is multiplied, the actual pitch of the armature winding will be correspondingly reduced. As will be apparent from the description hereinafter, the distribution of flux is so modified by the modifying poles 11 and 12, that the bipolar structure illustrated will have a distribution of flux through part of said structure, resembling the distribution in a four pole structure. In a four pole construction, the distribution of flux in part of the field frame would resemble the flux distribution in an eight pole structure. The same proportions will be carried out in constructions having other numbers of poles. As will appear as the description proceeds, the modifying poles will have common polarity, which polarity may be reversed under certain stages of operation. The 120 degree pitch of the armature winding has been chosen for the reason that such a winding is found to be equally effective in a bipolar or a four pole field construction.

The pole 9 may be notched out as indicated at 9' in order to increase the reluctance over the armature core teeth embracing the slots carrying the conductors undergoing commutation by brushes 7 and 8, thereby aiding the process of commutation by reducing the self induction of these coils.

Referring now to Fig. 5, the connections of the field windings and armature will now be described. The main field windings 13 are connected between the brush 5 on the one side and the point 16 on the other side. The point 16 is connected through the field coils 15, 15 to the brushes 7 and 8.

The supply circuit, which is indicated by the numerals 17, 18, is connected to the brushes 5 and 6. The output circuit 16' is connected between brushes 7 and 8 on one side, through coils 15, 15 in parallel to brush 6 on the other side. The circuit of windings 14, 14 is connected across the supply circuit, leading from the conductor 17 around the pole piece 11, thence around the pole piece 12, through the adjustable resistance 19 to the conductor 18. The coils 13, 13 on the main pole pieces 9 and 10, are wound to produce opposite polarities in said pole pieces. As illustrated, pole piece 9 has a north polarity, while pole piece 10 has a south polarity. Said pole pieces 9 and 10, therefore, constitute a bipolar structure in the machine illustrated. Windings 14, 14 are adapted to modify the flux developed by windings 13, 13.

When the machine is running on open circuit, that is, with the output circuit 16' disconnected, the modifying windings 14—14 will modify the flux of the machine in the manner indicated in Fig. 2, wherein the flux from the north main pole 9 may have a path either diametrically through armature 2 or may divide, part returning through pole piece 11 and part returning through pole piece 12, threading only a quadrant of the armature 2. The windings 15, 15 are connected in such a manner that when the output circuit 16' is connected, said windings 15—15 will oppose the windings 14—14 and under certain conditions will overcome said windings 14—14 whereby to reverse the polarity of modifying pole pieces 11 and 12. The flux paths under this condition of reversal are illustrated in Fig. 3, wherein the modifying poles are both of north polarity.

The current supplied to the output circuit 16' is furnished in substantially equal portions by brushes 7 and 8. This current passes around coils 15—15, uniting to supply the output circuit 16', thence back to the brush 6, which constitutes the negative brush of the machine. The voltage existing across brushes 7 and 8 and brush 6 depends upon the direction and degree of excitation of the modifying poles 11 and 12. For instance, in arc welding operations, it is often desired to have an open circuit voltage of approximately 60 volts and this value is obtained by exciting poles 11 and 12 as south poles by means of windings 14—14 which give a distribution of magnetic flux as illustrated in Fig. 2. The welding arc, however, requires for its maintenance a voltage in the neighborhood of 20 volts. In the dynamo electric machine as disclosed herein, the voltage is automatically reduced to the desired value by inherent action of the current passing around coils 15—15 which, as explained above, are wound in a direction to make poles 11 and 12 north poles, bringing about a distribution of flux illustrated in Fig. 3.

It will be noted that under these two conditions of operation, while the magnitude and direction of the flux in the modifying poles 11 and 12 may be varied or reversed, yet the flux through the main poles which determines the voltage on brushes 5 and 6, and thereby the speed of the machine, remains substantially unaltered.

The voltage conditions existing around the commutator of the machine according to the present invention, are illustrated by the curves A and B on the polar diagram, Fig. 4. It will be noted, however, from curve A that a potential of 60 volts exists between brushes 7 and 6 and between brushes 8 and 6, while 120 volts exists across brushes 5 and 6, this being the supply voltage. This represents the open circuit conditions when the modifying poles 11 and 12 are excited as south poles, as indicated in Fig. 2. When current is supplied to the welding circuit, however, this current, in traversing coils 15—15, will bring about a reversal in the polarity of poles 11 and 12, these poles now becoming north poles. This action, by decreasing the value of the flux effective on the armature conductors embraced between brushes 7—6 and 8—6 and correspondingly increasing the flux effective on the armature conductors embraced between the brushes 5—7 and 5—8, will bring about a condition illustrated by the curve B. From this curve it will be noted that the voltage between brushes 7—6 and brushes 8—6 has dropped to the neighborhood of 20 volts, while the voltage across brushes 5—6 remains the same, namely 120 volts.

The above illustration has been chosen from arc welding practice. The present invention is not limited, however, to arc welding machines, but has a much broader application. Another art in which the present invention is applicable is in arc lighting. In certain arts, as for instance in the arc lighting art, it may be desired to connect the output circuit between brushes 7 and 8 on the one side and brush 5 on the other side. In this case, brushes 7 and 8 will be negative, relative to brush 5, though still positive relative to brush 6. The voltage for striking the arc, according to the values indicated in Fig. 4, will be approximately 120 minus 20 or 100 volts, while the operating voltage will be approximately 120 minus 60 or 60 volts. Of course, in practice, means will be provided for varying the effects of the various windings, whereby any desired voltages within the range of the machine may be obtained.

Figure 6:
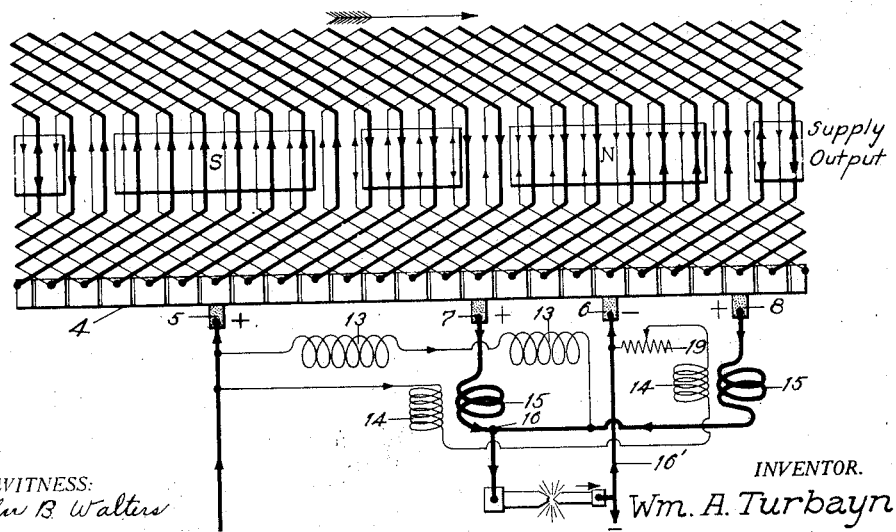

As explained above, the coils constituting the armature winding of the dynamo electric machine are placed in slots substantially 120° apart and are effective in either a two-pole or a four-pole field. The current supplied through the complete armature winding, through brushes 5 and 6 operating in a bipolar field produced by main poles 9 and 10, performs the motor functions, while the current supplied to the output circuit 16' from portions of the armature winding through brushes 7 and 8 and brush 6 results from a generating action and in value depends upon the direction and magnitude of the right angle component of flux produced by the modifying pole pieces 11 and 12. The distribution of current in the armature conductors is illustrated in Fig. 6 in which the presence and direction of current delivered by the supply circuit is indicated by the upper row of arrows. The presence and direction of current in the output circuit is indicated by the lower row of arrows. It will be noted that in none of the conductors does the sum of these currents flow.

One embodiment of the present invention has been described in detail. Many modifications will occur to those skilled in the art. It is intended in this patent to cover all such modifications that fall within the scope of the invention as defined by the appended claims.

What I claim as new and desire to secure by Letters Patent of the United States, is—

1. In combination, a supply circuit, an output circuit, and a direct current converter having main poles for setting up a main field flux, other poles for setting up a pair of modifying fields of flux symmetrically arranged relative to said first mentioned flux, means responsive to the supply circuit for exciting said second mentioned poles, and means responsive to the output circuit for opposing said first mentioned means.

2. In a direct current converter, means for setting up main field flux, means for setting up a pair of modifying fields of flux symmetrically arranged relative to said main flux, main brushes of opposite polarity adapted for connection to a supply circuit, a pair of other brushes of like polarity adapted with one of said main brushes to be connected to an output circuit, and electromagnetic means connected to said other brushes for controlling said modifying flux.

3. In a direct current converter, means for setting up main field flux, means for setting up a pair of modifying fields of flux symmetrically arranged relative to said main flux, main brushes of opposite polarity adapted for connection to a supply circuit, a pair of other brushes of like polarity adapted with one of said main brushes to be connected to an output circuit, and electromagnetic coils responsive to the current delivered through said other brushes for opposing and overcoming the effect of said second mentioned means.

4. In a dynamo electric machine, in combination, poles of opposite polarity for setting up main flux, poles of common polarity placed intermediate of said first mentioned poles, and means for automatically reversing said common polarity in response to a function of the output of said machine.

5. In a dynamo electric machine, in combination, poles of opposite polarity for setting up main flux, modifying poles placed intermediate of said first mentioned poles, means for exciting said modifying poles to produce a common polarity therein, and means for overcoming said first mentioned means and reversing the polarity of said modifying poles.

6. In a direct current converter, in combination, field poles of opposite polarity for setting up a main flux, modifying poles placed on opposite sides of one of said first mentioned poles for setting up a flux to modify the main flux, an armature, primary brushes located at points of maximum potential due to rotation in said main field, secondary brushes located 60 electrical degrees on either side of one of said primary brushes, said armature having a winding of 120 electrical degree pitch relative to said first mentioned poles.

7. In a dynamo electric machine, a field structure and field windings, said field structure having main poles of opposite polarities and intermediate poles of common polarity, and means responsive to the output of said machine for reversing said common polarity.

8. In a dynamo electric machine, a field structure and an armature, said field structure comprising means for setting up flux distribution through said armature in an $n$ pole form, means for setting up a flux distribution in one-half only of said armature in a $2n$ pole form, and means for causing transposition of said $2n$ pole form flux from one half of said armature to the other half in response to an output function of the machine.

9. In a dynamo electric machine, a field structure and field windings, said field structure having main poles of opposite polarities and intermediate poles of common polarity, and means responsive to the output of said machine for reversing said common polarity, said machine being provided with an armature having a winding pitch of an angular value intermediate of the angle between said main poles and the angle between adjacent poles.

10. In a dynamo electric machine, a field structure and an armature, said field structure comprising means for setting up flux distribution through said armature in an $n$ pole form, means for setting up a flux distribution in one-half only of said armature in a $2n$ pole form, and means for causing transposition of said $2n$ pole form flux from one half of said armature to the other half in response to an output function of the machine without materially affecting the $n$ pole form flux.

11. In combination, a supply circuit, an output circuit, and a direct current converter having main poles for setting up a main field flux, other poles for setting up a pair of modifying fields of flux symmetrically arranged relative to said first mentioned flux, means responsive to the supply circuit for exciting said second mentioned poles, and means responsive to the output circuit for opposing said first mentioned means, said converter having an armature winding pitch of substantially 120 electrical degrees relative to said main poles.

12. In a dynamo electric machine, in combination, poles of opposite polarity for setting up main flux poles of common polarity placed intermediate of said first mentioned poles, and means for reversing said common polarity, and an armature having a winding pitch of a value intermediate of the angle between said poles of opposite polarity and the angle between adjacent poles.

13. In a direct current converter, in combination, a field frame having main pole pieces, means for exciting said main pole pieces with opposite polarities, modifying pole pieces spaced substantially midway between said main pole pieces, an armature having a winding pitch of substantially 120 electrical degrees relative to said main pole pieces, primary brushes connecting with said armature at points of maximum potential due to rotation in the flux produced by said main pole pieces, secondary brushes located substantially 60 electrical degrees on either side of one of said primary brushes, means for exciting said modifying pole pieces with a common polarity, and means in series with said secondary brushes for opposing said last mentioned means.

14. In combination, a generator and a work circuit, windings for setting up main field flux, modifying windings for setting up opposed modifying fluxes in quadrature to said first mentioned flux, a pair of brushes placed at points of maximum potential difference due to armature rotation relative to said main field, a pair of other brushes spaced 120 electrical degrees apart and symmetrically with one of said first mentioned brushes, said work circuit being connected to said other brushes on one side and to one of said first mentioned brushes on the other side and including windings for opposing said modifying windings.

15. In combination, a generator and a work circuit, windings for setting up main field flux, modifying windings for setting up opposed modifying fluxes in quadrature to said first mentioned flux, a pair of brushes placed at points of maximum potential difference due to armature rotation relative to said main field, a pair of other brushes spaced 120 electrical degrees apart and symmetrically with one of said first mentioned brushes, said work circuit being connected to said other brushes on one side and to one of said first mentioned brushes on the other side and including windings for opposing said modifying windings, said generator having an armature winding pitch of substantially 120 electrical degrees.

16. In combination, a generator and a work circuit, said generator having field poles of opposite polarity for setting up a main flux, modifying poles placed on opposite sides of one of said first mentioned poles for setting up a flux to modify the main flux, an armature, brushes located at points of maximum potential difference due to rotation in said main field, other brushes located 60 electrical degrees on either side of one of said first mentioned brushes, said work circuit being connected to said other brushes on one side and to one of said first mentioned brushes on the other side.

17. In combination, a generator and a work circuit, said generator having field poles of opposite polarity for setting up a main flux, modifying poles placed on opposite sides of one of said first mentioned poles for setting up a flux to modify the main flux, an armature, brushes located at points of maximum potential difference due to rotation in said main field, other brushes located 60 electrical degrees on either side of one of said first mentioned brushes, said work circuit being connected to said other brushes on one side and to one of said first mentioned brushes on the other side, said generator including means for controlling the action of said modifying poles in response to the current in said work circuit.

18. In combination, a generator and a work circuit, said generator having field poles of opposite polarity for setting up a main flux, modifying poles placed on opposite sides of one of said first mentioned poles for setting up a flux to modify the main flux, an armature, brushes located at points of maximum potential difference, due to rotation in said main field, other brushes located 60 electrical degrees on either side of one of said first mentioned brushes, said work circuit being connected to said other brushes on one side and to one of said first mentioned brushes on the other side, said armature having a winding of 120 electrical degree pitch relative to said first mentioned poles.

19. In combination, a generator and a work circuit, said generator having field poles of opposite polarity for setting up a main flux, modifying poles placed on opposite sides of one of said first mentioned poles for setting up a flux to modify the main flux, an armature, brushes located at points of maximum potential difference due to rotation in said main field, other brushes located 60 electrical degrees on either side of one of said first mentioned brushes, said work circuit being connected to said other brushes on one side and to one of said first mentioned brushes on the other side, said generator including means for controlling the action of said modifying poles in response to the current in said work circuit, said armature having a winding of 120 electrical degree pitch relative to said first mentioned poles.

20. In combination, an armature, main field poles, brushes co-operating therewith, other brushes spaced from said first mentioned brushes, modifying poles, said modifying poles being provided with modifying windings which are connected to said other brushes and to a common point, thereby forming a local circuit including said other brushes, said modifying windings and part of said armature, said windings being so connected to said other brushes as to cause the current in said local circuit to set up a flux to oppose armature reaction.

In witness whereof, I have hereunto subscribed my name.

WILLIAM A. TURBAYNE.